March 4, 1941.  L. J. LARSON  2,233,455

METHOD OF WELDING

Filed May 21, 1938

Louis J. Larson
INVENTOR.

BY *Elwin A. Andrus*
ATTORNEY.

Patented Mar. 4, 1941

2,233,455

UNITED STATES PATENT OFFICE 2,233,455

METHOD OF WELDING

Louis J. Larson, Milwaukee, Wis., assignor to A. O. Smith Corporation, Milwaukee, Wis., a corporation of New York Application May 21, 1938, Serial No. 209,327

5 Claims. (Cl. 113—112)

This invention relates to an improved method of welding together two pieces of work, one or both of which is of a composition which is self hardening under the influence of the heat generated by welding. In welding such pieces, it has been necessary to heat treat the parts or plates welded together to remove brittleness resulting from air cooling of the metal. Generally this is accomplished in a furnace where cooling conditions may be carefully controlled to properly draw the temper from the metal, and where such heat treating equipment is available and economical, good welds may be obtained.

In some instances, heat treating equipment is not available to temper the metal after the weld is completed and in other cases it is more practical to heat treat part of the welded structure rather than the whole of it. The latter is particularly true in the manufacture of heavy walled pressure vessels of layer construction, certain parts of which are formed of an alloy steel which is self hardening as a result of welding. The selection of this alloy is made upon its adaptability for the purposes for which the vessel is to be used and the problem of welding the alloy is commensurate with the advantageous properties it possesses.

It is an object of the present invention to provide an improved method of welding such parts in which, due to previous heat treatment of the surfaces affected by welding, air hardening of the metal is effectively prevented and secondary heat treatment of the finished product no longer essential.

The method of manufacturing multi-layer pressure vessels is described in United States Letters Patent 1,925,118 issued September 5, 1933 to Richard Stresau. In the manufacture of such vessels, the shell section is made of layers while the heads are frequently formed from solid pieces. For certain uses, the inner layers of the shell section are formed from special alloy steel to resist corrosion or gas attack and the heads or end members are of similar composition. Vessels for use in hydrogenation processes are illustrations of the foregoing. Here the alloy selected may be a chrome-vanadium steel, a chrome-molybdenum steel, or some other steel which does not deteriorate in use. Some of these steels are self hardening. The process of welding such structures will be described in connection with the accompanying drawing.

Figure 1:
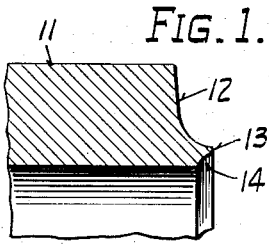
Figure 1 is a sectional view of a portion of the head or end member showing a preferred form of welding groove.

In Figure 1, the section of the end member 11 has a U-shaped scarf or welding groove 12, lip 13, and smaller scarf 14 to permit complete penetration by welding. The section shown is taken longitudinally of the end member, which may be forged or otherwise formed, to provide a closed head or tubular member. In pressure vessels, the groove 12 is annular but the principle of this invention is equally applicable to the welding of flat plates. The grooves 12 and 14 may be machined, pressed or cut according to available equipment.

Figure 2:
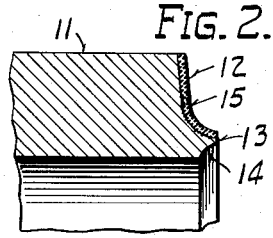
Fig. 2 is a sectional view of the portion of the head shown in Fig. 1 after a deposit of weld metal has been made upon the scarf.
Figure 3:
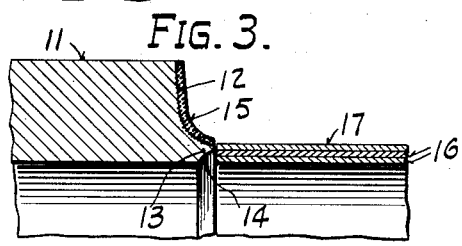
Fig. 3 is a sectional view of the portion of the head shown in Fig. 2 and the inner layers of the shell section in alignment for welding.

A weld deposit 15 is made on the surface of the groove 12, as illustrated in Fig. 2, said deposit being of a non-air hardening composition. The thickness of the deposit will depend a great deal upon the welding technique subsequently employed and in part upon the heat conductivity of the metal deposited. The deposit should be of a thickness slightly greater than the depth of the zone of the end member 11 which is hardened by welding. For different self hardening steels, this depth may be calculated in advance by depositing weld metal on a sample of the steel and taking hardness readings in the zone affected by welding. In following this procedure, the same welding method should be employed in making the deposit 15 as will be employed in welding the end member to the adjoining section of the vessel. The shape of the groove and the protrusion of the lip should be such that after the deposit 15 is made the surface formed will have the proper configuration for subsequent welding. Using a standard low-carbon, covered electrode and conventional arc welding technique for both the deposit 15 and the subsequent weld deposit, a thickness of approximately one-quarter of an inch is considered adequate to prevent formation of a martensitic zone in the self hardening steel adjacent the scarf.

Figure 4:
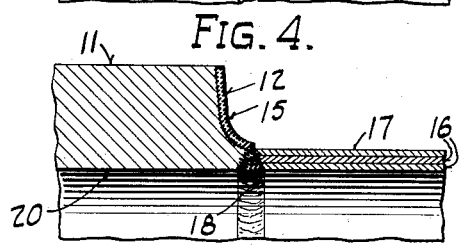
Fig. 4 is a sectional view of the structure shown in Fig. 3 after welding.

A ring section consisting of one or more layers 16 of alloy steel of a composition similar to the end member 11 and an outer layer 17 of steel which is not self hardening, is next brought into alignment for welding, said ring section being disposed opposite the smaller scarf 14 and the lip 13 of the end member 11. An arc deposit 18 is made in the smaller groove formed by these parts, using an alloy weld rod of suitable composition to obtain the desired weld characteristics. This deposit is illustrated in Fig. 4.

In the present application of the invention, the outer layers of the shell section may be of plain carbon steel or of some other steel which is not self hardening, the inner layers, such as layers 16 being the only layers which are self hardening. By forming layer 17 of a steel which is not self hardening and welding it to the end member 11 prior to the application of the outer layers in the manner here described, the outer layers may be welded to the shell section without danger of the welding heat embrittling the inner layers 16. In this respect layer 17 will serve a similar purpose as the deposit 15 in protecting the self hardening steel.

The ring section comprising the layers 16 and 17 and the end member 11 are next placed in a furnace and heat treated to remove the brittleness in the alloy steel adjacent to the surfaces where welding has been performed. This treatment may comprise completely annealing the steel by heating it above its critical temperature and then slowly cooling it, or it may comprise heating the steel slightly below its critical temperature to draw the hardness from the areas affected by welding. The latter procedure may be followed when the alloy steel has been previously annealed at some time during the forming process. Where the alloy is a chrome-vanadium steel, having 1.5% chromium and .2% to .25% vanadium with a carbon content of approximately .20%, it has been found that a temperature range from 1200° to 1250° F., will draw the temper from the hardened zone and restore the original desirable properties of the alloy for the purposes here contemplated. Different treatments must be given different alloys, as will be understood by those familiar with this art, and such variations in treatment are contemplated and intended to be included as part of this invention.

Figure 5:
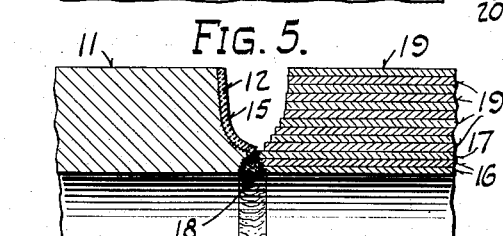
Fig. 5 is a sectional view of the structure shown in Fig. 4 after the application of outer layers to the shell section.

Fig. 5 shows additional layers 19 superimposed on the ring section comprising layers 16 and 17. Where such outer layers are protected against attack by gas from the reaction chamber, plain carbon steel may be employed without danger of embrittlement resulting from gas penetration. In fabricating layer vessels, as described in the Stresau patent previously mentioned, the plates forming the layers are wrapped in tight concentric engagement and the desired wall thickness is thus obtained. The ends of the layers opposing the groove 12 in the end member 11 may be set back to form a tapered groove which is desirable to prevent undercutting in the event several passes are made while welding. Somewhat similar results may be obtained by machining or chipping out a surface which is inclined toward the bottom of the groove in a manner roughly complementary to the scarf 12 on the end member.

Figure 6:
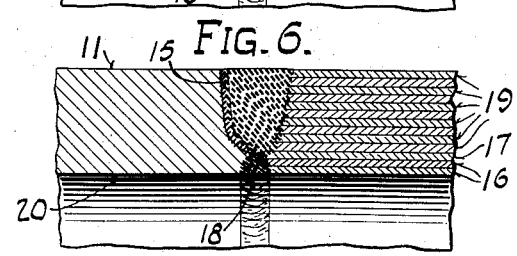
Fig. 6 is a cross sectional view of the finished welded joint between the shell section and the end member.

A weld deposit is next made in the large outer groove formed as described in the preceding paragraph. In making this deposit a covered electrode is preferably used although other welding technique may be employed. Prior to welding, the bottom of the groove formed by the lip edge 15 may be chipped out to remove slag, but in so doing care must be exercised not to remove too much of the coating formed by the deposit 15. Fig. 6 illustrates the finished weld.

Where it is desirable to perform machining operations on the surface 20 of the end member 11, this operation should be performed after heat treating in order to avoid deformation which might result therefrom.

Figure 7:
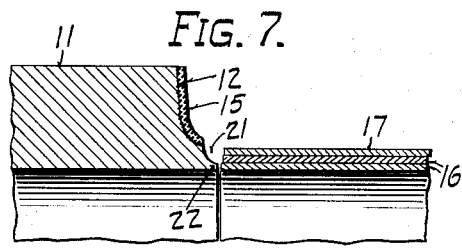
Fig. 7 is a cross sectional view of an end member and the alloy layers of the shell section showing an alternate form of welding groove.
Figure 8:
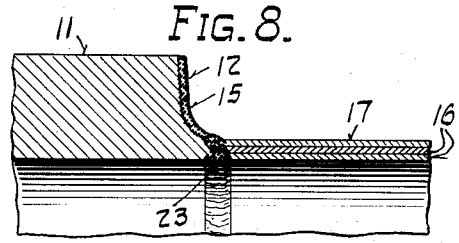
Fig. 8 is a view similar to Fig. 7 showing the alloy layers welded to the end member.

In Fig. 7 an alternate procedure is disclosed in which a smaller groove 21 is disposed at the bottom of the large groove 12. Lip 22 instead of separating these grooves, as illustrated in the preceding views, is at the lower edge of the end member 11. Alloy weld metal is deposited in the smaller groove 21 from the outside of the vessel and the lips at the bottom of the groove are then chipped out and a deposit 23 made from the inside with a similar alloy weld rod to insure complete penetration. The larger groove 12 is provided with a protective deposit 15, as in the first illustration, and the procedure in all other respects is similar.

Figure 9:
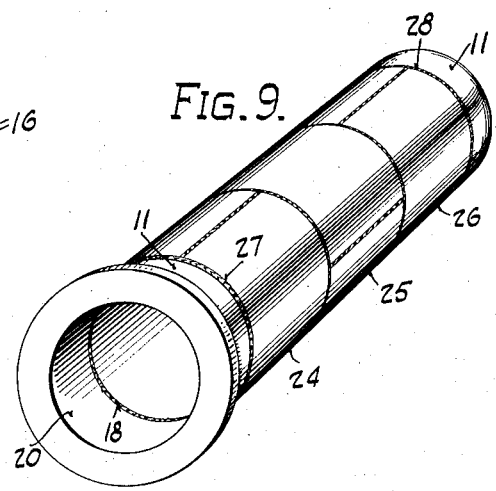
Fig. 9 is a perspective view of a completed pressure vessel constructed according to the description.

In making a pressure vessel, a similar joint will be provided between the layer section and the other end member. Frequently there are several ring sections 24, 25 and 26 arranged end to end, as shown in Fig. 9, the outer ones 24 and 26 of which will be welded as here described to the two end members 11 by the circumferential welds 27 and 28.

Figure 10:
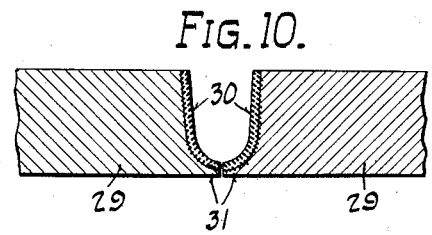
Fig. 10 is a sectional view of two thick, mono-layer plates positioned for welding according to the present invention.

In Fig. 10 two single layer plates 29 are shown positioned for welding. Where these plates are of a self hardening type of steel which is embrittled by welding, a deposit 30 is first made in a suitable U shaped groove, said deposit being similar in thickness to the deposit 15 made in the end member 11 of the first illustration. Care must be exercised in order that this deposit in the region of the lips 31 will be adequate to protect the adjacent metal from heating effect during subsequent welding. Similar precautions should prevail regardless of the particular type of groove and form of lips.

After making the deposit 30, the two pieces may be separately heat treated to remove brittleness. They are then in condition for final welding, after which no further heat treatment is required.

As previously stated, avoidance of heat treatment after performing the final welding operation is, in many instances, extremely advantageous. By the present method, a deposit of weld metal is made on the welding surface of sufficient depth to prevent heat generated when the final weld is made from penetrating into the self hardening metal and causing brittleness. Heat treatment must be applied after making the protective deposit to remove hardness, but this treatment may be given the individual pieces. Subsequent welding will not embrittle the parent metal because of the protection afforded by the deposited layer. If this deposit is composed of a metal which is not self hardening, welding adjacent to it will not cause brittleness. As illustrated herein, the deposit may only have to be applied to one of the pieces being welded because the other piece may not be of self hardening composition.

Other physical properties than hardness may be taken into consideration in determining the use to which the invention may be applied, it being understood that the invention is applicable to preserve the physical properties of the parent metal being joined.

While the invention has been illustrated in several forms, no limitation on its scope is intended to be expressed thereby, the true scope of the invention being expressed in the following claims.

The invention having been described, what is claimed is:

1. The method of welding a solid piece end member to a multi-layer shell section of a pressure vessel where said end member and one or more inner layers of said shell section are of a metal which is self hardened by welding, which comprises depositing on the scarf of the end member a layer of weld metal which is not hardened by welding operations, enclosing the aforesaid one or more layers of the shell section with a layer of metal which is not self hardened by welding, aligning the layer section thus formed with the end member and welding the two parts together, heat treating the parts to remove hardness, forming additional layers around the previously formed shell section and joining said additional layers to the aforesaid end member by welding in the groove protected by said deposit.

2. The method of welding together two metal parts one of which is of a metal which is self hardened by welding, which comprises forming a welding groove on the part which is self hardened by welding, depositing parallel to the sides and bottom of said groove a layer of weld metal of non-self hardening characteristics of a thickness as great as the depth of the self hardening metal which is affected by welding, said deposit building up the walls of said groove to the desired shape for final welding, heat treating the metal which is self hardened to remove hardness and thereafter welding the parts together.

3. The method of welding together two pieces of metal, at least one of which is subject to change in its physical properties adjacent the weld by the welding operation, which comprises welding an extension of metal which is not subject to such change to the edge of said piece subject to change to protect the latter from undergoing changes in physical properties as a result of subsequent welding operations, heat treating the composite piece to provide the desired physical properties in the metal thereof, and subsequently welding said pieces together with said added metal between the weld and the original piece subject to change.

4. In the welding of parts of substantial thickness wherein frequent annealing of the structure would normally be required during the welding operation by reason of the fact that at least one of the parts is of a composition which is detrimentally affected in a region adjacent the weld when raised above its critical temperature by heat from the welding operation and cooled rapidly by heat transfer into the surrounding metal, the method which eliminates such necessity and which comprises the preliminary steps of first fusing to the surface of said part which would normally be fused with the weld metal, an intermediate layer of metal which is not detrimentally affected by such subsequent welding operations and of a thickness which, after allowing for the fusion of a part of it in the subsequent welding operations, will provide a region of heat gradient preventing any part of the original part from being heated to above its critical temperature by the subsequent welding operations, and then annealing said part with its surface layer to restore the original desired properties of the metal in the region immediately below the surface layer deposited thereon, subsequent welding operations being carried out in the ordinary manner without intermediate annealing.

5. In the welding of parts of substantial thickness wherein at least one of the parts is of a composition subject to air hardening in the region normally adjacent to the weld metal by reason of the heat of the welding operation, the method of preventing such hardening of the metal and eliminating the necessity for annealing the structure during or after welding and which comprises the steps preliminary to welding of covering the surface of said part, which would normally be fused with the weld metal, with a layer of metal not subject to air hardening, and of a thickness which, after allowing for the fusion of a part of it in the subsequent welding operations, will provide a region of heat gradient preventing any part of the original air hardening metal from being heated to above its critical temperature by the subsequent welding operations, and then annealing said part with its surface layer to restore the original desired properties of the metal in the region immediately below the surface layer deposited thereon, and finally welding said parts together by fusing weld metal therebetween.

LOUIS J. LARSON.

DISCLAIMER 2,233,455.—*Louis J. Larson*, Milwaukee, Wis. METHOD OF WELDING. Patent dated March 4, 1941. Disclaimer filed August 11, 1943, by the inventor; the assignee, *A. O. Smith Corporation*, consenting.

Hereby enters this disclaimer to claim 3 in said specification.

[*Official Gazette September 21, 1943.*]